F. C. MAHAFFEY.
EGG CANDLER.
APPLICATION FILED AUG. 18, 1919.
1,328,091.
Patented Jan. 13, 1920.
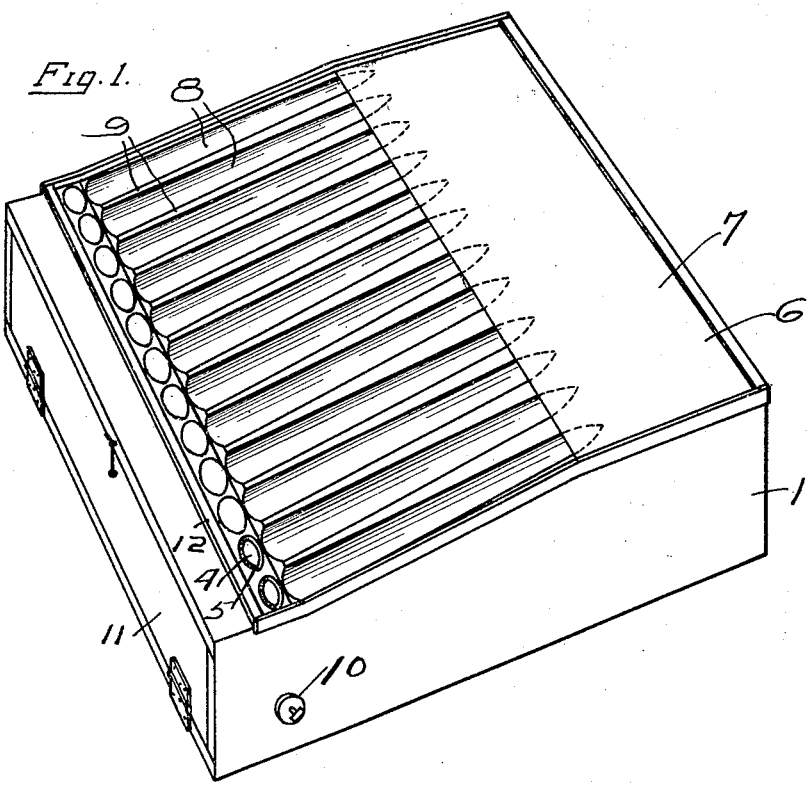
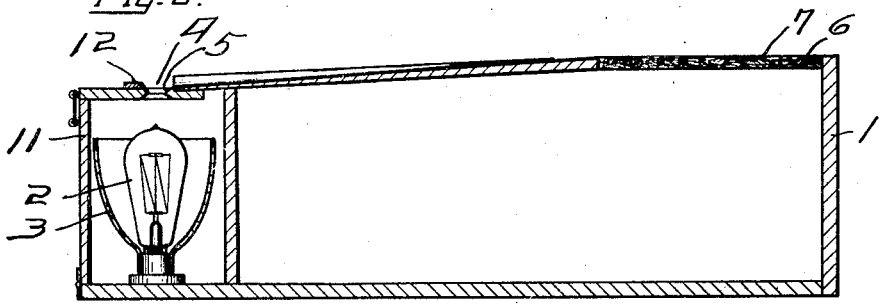
INVENTOR
Florence C. Mahaffey.
by
Owen, Owen & Crampton

UNITED STATES PATENT OFFICE.

FLORENCE C. MAHAFFEY, OF TOLEDO, OHIO.

EGG-CANDLER.

1,328,091.  Specification of Letters Patent.  Patented Jan. 13, 1920.

Application filed August 18, 1919. Serial No. 318,160.

*To all whom it may concern:*

Be it known that I, FLORENCE C. MAHAFFEY, a citizen of the United States, and a resident of Toledo, in the county of Lucas and State of Ohio, have invented a certain new and useful Egg-Candler; and I do hereby declare the following to be a full, clear, and exact description of the invention, such as will enable others skilled in the art to which it appertains to make and use the same, reference being had to the accompanying drawings, and to the characters of reference marked thereon, which form a part of this specification.

My invention has for its object to provide a means whereby eggs may be rapidly candled. It particularly has for its object to provide a means whereby the eggs will roll into position over a light concentrating means whereby at a glance the quality of the eggs may be determined.

Constructions containing the invention may partake of different forms.

For purposes of illustration I have selected a construction containing the invention and shall describe it hereinafter. The construction selected is illustrated in the accompanying drawings.

Figure 1 of the drawings is a perspective view of the construction selected. Fig. 2 is a sectional view showing the interior of the construction.

1 is a frame which may be in the form of a box. A row of lamps 2 are located in one end of the box. They are provided with reflectors 3 that concentrate the light of the lamp 2 upon a row of openings 4 formed in the top of the box. The openings 4 are egg-shaped and have beveled edges 5 to conform substantially to the shape of the eggs. The box or frame 1 is provided at one end by a horizontal platform or surface 6 on which the eggs to be candled may be placed. The platform 6 may be covered with a sheet of cushioning material 7, if desired, to form a cushion to support the eggs and to reduce breakage in the handling of the eggs. The top of the box or frame is provided with a corrugated surface which is located intermediate the platform 6 and the row of openings 4. The corrugations increase in depth as they approach the openings. Each of the corrugations 8 terminate opposite an opening 4. The corrugations are separated by ridges 9. The contour of the cross sections of the corrugations is substantially the same shape as the sections through the long axes of the eggs so that when the eggs are placed in the inclined channels formed by the corrugations they will automatically place and maintain their longer axes in a position transverse to the corrugations and will roll from the platform 6 into the egg-shaped openings and thus automatically place themselves in position to be candled and also in such position as to shut out all of the light except that which passes through them whereby the condition of the eggs may be quickly and readily determined.

In the use of my invention a large number of eggs are placed on the platform and then are moved readily and rapidly by the operator to the upper ends of the corrugations whence they will roll and take their position in the openings 4 above the lamps 2 and the reflectors 3. The eggs may then be assorted by the operator. For controlling the lamps the switch 10 may be used and the box or frame 1 is provided with a cover or gate 11 for the purpose of manipulating the lamps. The frame or box is also provided with a cushioning strip 12 located in proximity to the openings to stop the eggs when they drop in the openings and to prevent breaking of the eggs. The strip 12 operates to break the fall of the eggs when they enter the openings 4.

I claim:

1. In an egg candler, a frame, a row of lamps located in one end of the frame, a horizontal platform located on the frame, a plurality of egg-shaped openings located above the lamps, a corrugated surface having inclined corrugations located intermediate the platform and the openings for directing the eggs from the platform to the openings.

2. In an egg candler, a frame having a closed receptacle located in one end thereof, a plurality of lamps, the receptacle having a plurality of egg-shaped openings located in line with the light of the lamps, the frame having a plurality of channels having inclined egg-shaped surfaces, a platform located at the shallow ends of the channels whereby the eggs will be directed automatically to the egg-shaped openings.

In testimony whereof I have hereunto signed my name to this specification.

FLORENCE C. MAHAFFEY.